United States Patent [19]
Martner
[11] 3,846,779
[45] Nov. 5, 1974

[54] ULTRASONIC TRANSDUCER

[75] Inventor: John G. Martner, Atherton, Calif.

[73] Assignee: Charles E. Galloway, San Jose; Keith W. Gray, Sunnyvale, Leatrice J. Carr, East Palo Alto, all of Calif.

[22] Filed: Aug. 28, 1972

[21] Appl. No.: 284,344

[52] U.S. Cl. .................. 340/258 B, 310/8.2, 340/15
[51] Int. Cl. .......................................... G08b 13/16
[58] Field of Search.... 340/15, 16 R, 258 A, 258 B; 310/8.2

[56] References Cited

UNITED STATES PATENTS

| | | | |
|---|---|---|---|
| 3,271,755 | 9/1966 | Bagno | 340/258 A |
| 3,321,189 | 5/1967 | Scarpa | 310/8.2 X |
| 3,209,176 | 9/1965 | Paley | 310/8.2 |
| 3,524,085 | 8/1970 | Shoh | 310/8.2 |
| 3,578,996 | 5/1971 | Balamuth | 310/8.2 X |
| 2,956,789 | 10/1960 | Rich | 259/72 |
| 3,311,760 | 3/1966 | Durgin et al. | 310/8 |
| 3,363,118 | 1/1968 | Sims | 310/8.7 |
| 3,376,521 | 4/1968 | Traub | 333/71 |
| 3,401,275 | 9/1968 | Curran et al. | 310/8.2 |

*Primary Examiner*—David L. Trafton
*Attorney, Agent, or Firm*—Limbach, Limbach and Sutton

[57] ABSTRACT

An electromechanical transducer for transmitting ultrasonic waves in air having a resonant frequency substantially equal to the resonant frequency of the piezoelectric emitter element, the transducer being suitable for transmitting ultrasonic vibrations in air or for receiving ultrasonic vibrations from air for conversion into corresponding electric signals for use in alarm devices.

3 Claims, 6 Drawing Figures

ULTRASONIC TRANSDUCER

BACKGROUND OF THE INVENTION

This invention relates to a piezoelectric transducer for converting electrical energy into acoustical energy in an air environment or to convert acoustical energy into electrical energy. Transducers having piezoelectric elements are used for converting vibrations into electrical signals or electrical signals into vibrations. Examples of the former, which is termed the direct piezoelectric effect, are crystal microphones and phonograph pickups. Examples of the latter, which is termed the direct piezoelectric effect, are underwater sound ranging equipment and most pertinently, ultrasonic burglar alarm systems.

The inverse piezoelectric effect, converting electrical signals into vibrations, is obtained by attaching an electrode to each side of a piezoelectric element and generating an alternating electric field across the element. The element may be a crystal of quartz or rochelle salt, a ceramic of barium titanate or a number of other compounds exhibiting the piezoelectric effect in varying degrees. Depending on the configuration of the piezoelectric element, the alternating field generates a strain in the element's structure which causes a lengthening and shortening or in some structures a warping in the element that may be utilized to induce a vibration in a mechanically coupled structure such as a diaphragm.

It is known that if a piezoelectric crystal is driven by an alternating voltage having a frequency equal to a mechanical resonance frequency of the crystal large strains can be achieved by the reaction of the direct piezoelectric effect on the circuit. A piezoelectric element or resonator of this kind tuned to a defined frequency is suitable for incorporation in a feedback circuit for regulating the frequency of a power oscillator.

The instantaneous mechanical response of the piezoelectric element to a power oscillator is also ideally suited for an ultrasonic transducer. In an air environment, however, even a tuned piezoelectric resonator is incapable of transferring sufficient ultrasonic energy into air for most purposes without an additional means of enhancing the effective interface between the piezoelectric element or emitter and the air environment. The present invention couples a piezoelectric element and a vibrating plate preferably having a mechanical resonance frequency matching that of a mechanically coupled emitter. This arrangement has gained immediate acceptance for use in an ultrasonic burglar alarm system for transmitting ultrasonic waves in the air which are detected by a spatially displaced receiver. Objects moving within the field of the transmitter and receiver are detected by the shift in frequency of sound waves reflected by the moving object in what is commonly known as the "Doppler effect." Improvements to the present invention to further enhance ultrasonic energy transmission are disclosed in my co-pending application, Ser. No. 254,722, entitled "ULTRASONIC TRANSDUCER APPARATUS."

SUMMARY OF THE INVENTION

The transducer of the present invention transmits ultrasonic waves of high magnitude by coupling a piezoelectric crystal or ceramic to a resonant plate having a resonant frequency approximately equaling the resonant frequency of the crystal or ceramic. While the invented transducer has found wide use as a transmitter, it can be employed as a receiver as well. When employed in the latter use, the receiver is generally coupled to an emitter which is tuned to the same resonant frequency as the receiver.

Piezoelectric elements have a unique feature in that when excited by an oscillating electrical current, the element changes its configuration in a manner corresponding to the frequency of the exciting current. By cutting a piezoelectric crystal or ceramic element in a selected manner, the deformation can be confined to a vibratory elongation and contraction of the element. The magnitude of deformation corresponds both to the intensity of the exciting current, and the relationship of the exciting current frequency to the resonant frequency of the element. When the exciting frequency of the current is at the natural resonant frequency of the element, the magnitude of deformation is generally at its greatest. When the piezoelectric element is coupled to a flat plate of substantially greater dimensions than the element, the plate is induced to vibrate by the vibratory motion of the element when excited. When the natural resonant frequency of the plate is selected to coincide with the excited frequency of the piezoelectric element, the induced vibrations in the flat plate are of substantially greater magnitude than otherwise possible. The ultrasonic transducer of this invention, therefore, comprises a piezoelectric element coupled to a substantially larger flat plate which is preferably of a natural resonant frequency that coincides with the excited frequency of the piezoelectric element. Additionally, it is preferred that the piezoelectric element have a resonant frequency coincident with the resonant frequency of the coupled plate. While the transducer can be employed for a variety of purposes such as in sonic ranging equipment, the primary use contemplated is for a transmitter and/or receiver for a burglar alarm system. The invention is shown in the accompanying drawings and described in greater detail in the following specification.

DETAILED DESCRIPTION OF THE PREFERRED EMBODIMENT

Figures 1, 2:
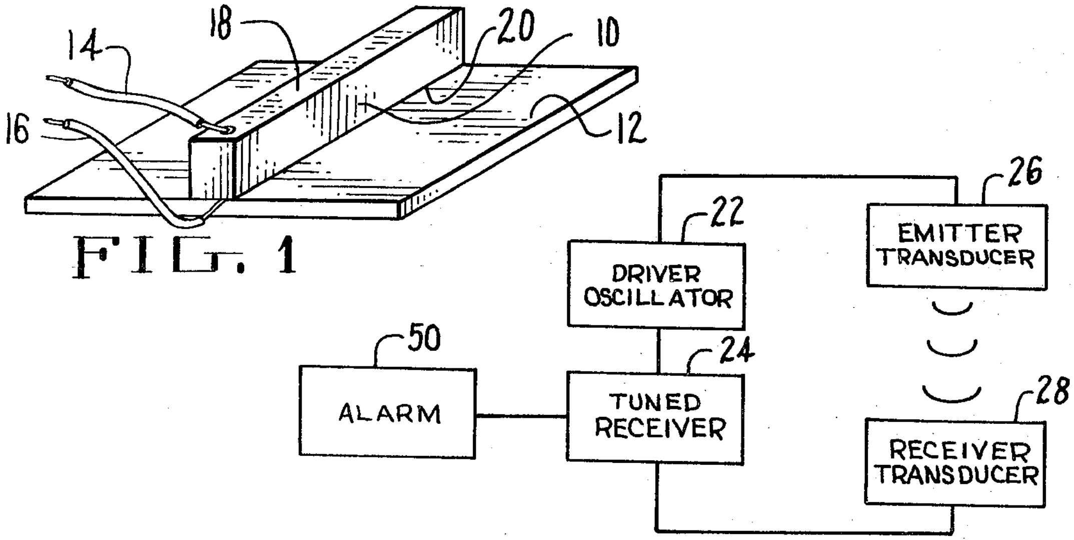
FIG. 1 is a perspective view of the preferred embodiment of the transducer.
FIG. 2 is a schematic view of a block diagram of an alarm system.

Referring to the drawings and in particular to FIG. 1, the preferred embodiment of the invented transducer is shown. An elongated rectangular piezoelectric element 10 is mechanically coupled to a large flat rectangular plate 12. The piezoelectric elmenet is preferably fabricated from a barium titinate ceramic which can be obtained as a shelf item in a variety of sizes and shapes. The plate can be fabricated from a variety of materials including plastics, but is preferably a metal and in the preferred embodiment comprises an aluminum plate having dimensions approximately 6 inches in length, 4 inches in width along the piezoelectric element, and 1/16 inch in thickness. The piezoelectric element 10 is mounted to the flat plate with an epoxy adhesive or other adhesive or fastener.

Two terminal leads 14 and 16 are electrically connected to opposed contact faces 18 and 20, respectively. To enhance the connection and provide a surface distribution for the contact face, the opposed faces may be covered with a thin layer of electrically conductive material which may be vapor deposited on the contact faces. The free ends of the terminal leads 14 and 16 are connected either to a driver oscillator 22 or a tuner receiver 24 as shown schematically in FIG. 2 depending on whether the transducer is used as an emitter transducer 26 or a receiver transducer 28. The invented transducer has found preferred use as an emitter because the high energy transmission characteristics of the transducer are more outstanding than the sensitivity characteristics.

When the transducer of FIG. 1 is used in an alarm system, it may be mounted to a wall or ceiling either flush thereto or protruding therefrom. Suitable mounting means such as brackets will be apparent to one skilled in the art. It is preferred that the periphery of the plate be free and not secured to any support surface. In this manner the full surface of the plate will be employed as a transmitting surface at the air interface and will not be subjected to dampening effects by restraining the plate edges from vibrating.

It is a known phenomenon that piezoelectric crystal and ceramic elements vibrate in a manner corresponding to the exciting frequency of the oscillating voltage across the elements. At certain defined frequencies the elements assume a resonant or high amplitude vibration. This frequency varies according to the particular material and configuration of the element. Thus, for a given power input, a maximum vibration excitation will occur at this resonant frequency. By tuning the driver oscillator, and the piezoelectric element to this resonant frequency, the coupled plate will reflect the induced vibration as a high energy transmission output.

To further enhance the level of output energy at the transducer-air interface, the plate can be selected to have a natural resonant frequency approximately equal to the resonant frequency of the coupled piezoelectric element. While the frequency of resonant modes in a flat rectangular plate can theoretically be calculated, the calculated frequency is for a free standing plate. Coupling of the transducer to the plate will alter the calculable frequency and necessitate determination of the ultimate matching resonant frequency by trail and error. This method, of course, can be improved for mass produced transducers of identical design.

Figure 3:
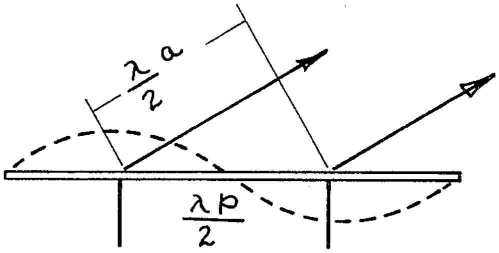
FIG. 3 is a schematic view of a vibrating flat plate.
Figure 4:
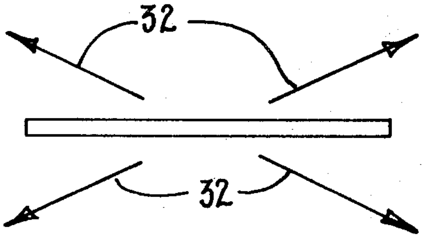
FIG. 4 is a further schematic view of a vibrating flat plate.

Referring to the schematic illustration of FIG. 3, when a flat plate 30 is vibrated at its resonant frequency certain modes are established as shown in the illustration in phantom. There is modal cancellation in some directions and modal enhancement in others. Due to the large surface vibrating, in the directions of enhancement as schematically indicated by the arrows, the resulting beam intensity more than compensates for the cancelled directions. The direction of enhancement is found by the equation:

$$\cos\theta = \lambda a / \lambda p$$

where $\theta$ is the direction angle and $\lambda a$ and $\lambda p$ are the wave lengths of the vibration in air and plate respectively. On each plate there are therefore four directions of enhancement as schematically illustrated on plate 32 in FIG. 4.

Figures 5, 6:
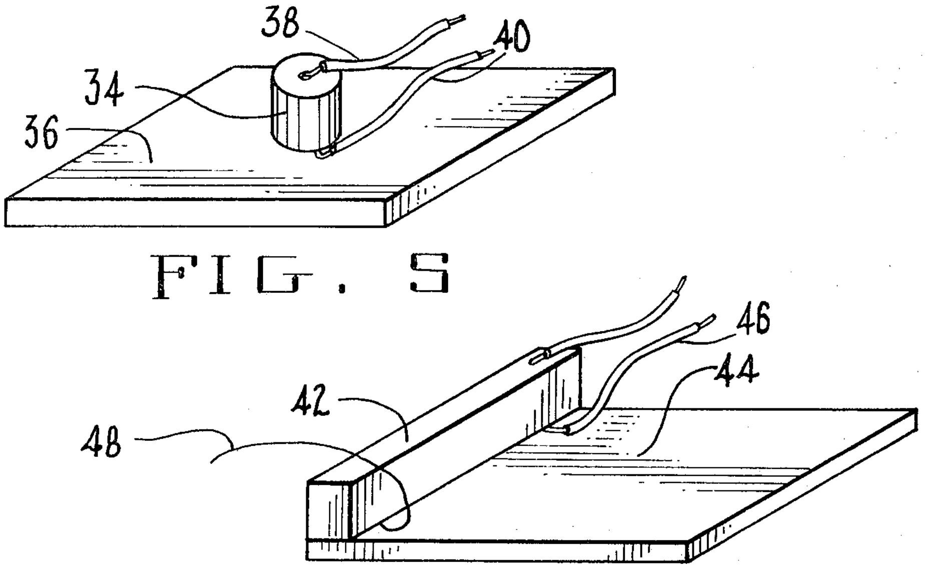
FIG. 5 is a perspective view of an alternate embodiment of the transducer.
FIG. 6 is a perspective view of an additional alternate embodiment of the transducer.

Referring to the alternate embodiment of the transducer shown in FIG. 5, a cylindrical piezoelectric element 34 of barium titanate is shown mechanically coupled to the center of a substantially larger flat plate 36. Terminal leads 38 and 40 are connected to the piezoelectric element 34 to convey signals to or from the element 34. The central location of the driving piezoelectric element will cause vibrational patterns to be set up in the plate which are different than in the embodiment of FIG. 1, but the basic operation is the same. By matching the resonant frequency of the coupled plate 36 to the resonant frequency of the piezoelectric element 34 an enhanced level of ultrasonic waves can be transmitted to the surrounding air.

Referring to FIG. 6 an additional alternate embodiment is shown to illustrate the variety of ways a piezoelectric element can be coupled to a large flat plate for ultrasonic wave transmission or reception. In FIG. 6 an elongated rectangular piezoelectric element 42, which again is preferably a barium titinate ceramic, is mechanically coupled to a substantially larger flat plate 44. Terminal leads 46 and 48 are connected to the piezoelectric element 42 to convey signals to or from the element 42. However, in FIG. 6 the piezoelectric element is coupled to one end of the plate. In the same manner as in the other embodiments the excited piezoelectric elements will induce vibrations in the coupled plate which will transmit the vibrations as sound waves in the surrounding air. Again, by matching the resonant frequency of the coupled plate to the resonant frequency of the piezoelectric element an enhanced level of transmission can be obtained. Conversely, in the respective embodiments a matching of this nature will enhance the sensitivity to the transducers when employed as a receiver.

Referring again to FIG. 2 the schematic block diagram therein illustrates the general manner in which the transducer of this invention is employed for a burglar alarm system. The driver oscillator 22 generates an a.c. frequency which is supplied to the emitter transducer 26 to induce an ultrasonic wave emission in an air environment. By utilizing a predetermined frequency within the ultrasonic range, a continuous ultrasonic transmission is emitted, which is neither heard nor transmitted to an environment outside a closure such as a room. The ultrasonic emissions are detected by the spatially displaced receiver transducer 28, which converts induced vibrations in the transducer to electrical signals which are fed to the electrically connected tuned receiver 24. The tuned receiver utilizes conventional circuitry to determine the frequency of the signals received and to detect changes in these signals. Defined changes caused by objects or persons moving within the field between the emitter transducer and receiver transducer are detected by the receiver and by appropriate triggering circuitry in the receiver cause alarm 50 to signal the presence of an intruder.

For example, an emitter transducer driver at a constant 38 KHz by an oscillator, will emit a 38KHz ultrasonic wave which is altered by approximately 40 Hz by a person moving within the field of emission. A receiver transducer spaced from the emitter transducer and tuned to the 38 KHz frequency by appropriate conventional circuitry detects the 40 Hz shift and by additional circuitry triggers the alarm. The alarm may comprise a variety of conventional systems ranging from a simple electric bell to a complex video-tape monitoring camera.

I claim:

1. In an alarm device for detecting variations in ultrasonic signals and activating an alarm, a transducer for transmitting or receiving ultrasonic signals is an air environment comprising a piezoelectric element coupled to a thin flat plate which is substantially larger than said piezoelectric element and which has a periphery maintained substantially free and unsupported during operation, said piezoelectric element having a resonant frequency at which it is excitable and said flat plate having a resonant frequency when coupled to said element substantially equal to the resonant frequency of the piezoelectric element.

2. The transducer of claim 1 wherein said flat plate is generally rectangular.

3. An alarm device comprising a transducer for transmitting ultrasonic signals in an air environment for detection of intruding objects for persons therein, the transducer having a piezoelectric element coupled to a thin, flat, resonant plate substantially larger than said piezoelectric element, the plate having a periphery substantially free and unsupported during operation, said peizoelectric element being excitable at a resonant frequency of said plate when coupled to the piezoelectric element, and, means for detecting variations in ultrasonic signals in an air environment and activating an alarm.

* * * * *